United States Patent
Khairullah et al.

(10) Patent No.: US 7,968,137 B2
(45) Date of Patent: *Jun. 28, 2011

(54) METHOD FOR DEHYDRO-ROASTING

(75) Inventors: Abizer M. Khairullah, Modesto, CA (US); Wade H. Swanson, Modesto, CA (US); Ingrid A. Montgomery, Stockton, CA (US)

(73) Assignee: Olam West Coast, Inc., Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/234,797

(22) Filed: Sep. 22, 2008

(65) Prior Publication Data

US 2009/0087529 A1    Apr. 2, 2009

Related U.S. Application Data

(63) Continuation of application No. 10/978,340, filed on Nov. 1, 2004, now Pat. No. 7,438,943.

(51) Int. Cl.
*A23L 1/01* (2006.01)
*A23L 1/212* (2006.01)
(52) U.S. Cl. ......... 426/523; 426/518; 426/524; 426/615
(58) Field of Classification Search .................. 426/524, 426/523, 518, 615
See application file for complete search history.

(56) References Cited

U.S. PATENT DOCUMENTS

| | | | |
|---|---|---|---|
| 2,388,298 A | 11/1945 | Stephens | |
| 2,703,761 A | 3/1955 | Todd | |
| 3,098,750 A | 7/1963 | Prater et al. | |
| 3,188,750 A | 6/1965 | Davis et al. | |
| 3,408,208 A | 10/1968 | Lamb | |
| 3,408,209 A | 10/1968 | Cording, Jr. et al. | |
| 3,493,400 A | 2/1970 | Truckenbrodt et al. | |
| 3,573,937 A | 4/1971 | Sarna | |
| 4,002,772 A | 1/1977 | Haas | |
| 4,054,672 A | 10/1977 | Inoue et al. | |
| 4,254,153 A | 3/1981 | Ross et al. | |
| 4,332,824 A | 6/1982 | Kahn et al. | |
| 4,350,711 A | 9/1982 | Kahn et al. | |
| 4,390,550 A | 6/1983 | Kahn et al. | |
| 4,647,469 A | 3/1987 | Jakobsson et al. | |
| 5,110,609 A | 5/1992 | Lewis et al. | |
| 5,155,923 A * | 10/1992 | Wireman et al. ............. | 34/318 |
| 5,256,438 A | 10/1993 | Lewis et al. | |
| 5,393,543 A | 2/1995 | Laufer | |

(Continued)

FOREIGN PATENT DOCUMENTS

EP    0289060    11/1988

(Continued)

OTHER PUBLICATIONS

U.S. Appl. No. 10/298,873: Non-Final Office Action dated Jun. 17, 2010 (6 pages).

(Continued)

*Primary Examiner* — Helen F Heggestad
(74) *Attorney, Agent, or Firm* — McDermott Will & Emery LLP

(57) ABSTRACT

A method for preparing roasted vegetables includes drying a vegetable to reduce the moisture level from 10% to 65% from the starting moisture level of the vegetable. The method for preparing roasted vegetables further includes roasting the vegetable for between about 0.25 seconds to about 15 seconds.

24 Claims, 1 Drawing Sheet

U.S. PATENT DOCUMENTS

| | | | |
|---|---|---|---|
| 5,447,737 | A | 9/1995 | Blandine et al. |
| 5,609,902 | A | 3/1997 | Inakuma et al. |
| 5,645,876 | A | 7/1997 | Subramaniam et al. |
| 5,747,087 | A | 5/1998 | Fosbol et al. |
| 5,916,624 | A | 6/1999 | Ajmera |
| 5,955,130 | A | 9/1999 | Gagliardi et al. |
| 6,004,590 | A | 12/1999 | Subramaniam et al. |
| 6,086,933 | A | 7/2000 | Rockstrom |
| 6,099,882 | A | 8/2000 | Risner, Jr. et al. |
| 6,468,573 | B1 | 10/2002 | Herrick et al. |
| 6,599,547 | B1 | 7/2003 | Villagran et al. |
| 7,438,943 | B2 * | 10/2008 | Khairullah et al. ........... 426/518 |
| 2004/0234659 | A1 | 11/2004 | Linton |

FOREIGN PATENT DOCUMENTS

| | | |
|---|---|---|
| JP | 54140759 | 11/1979 |
| JP | 57152861 | 9/1982 |
| JP | 63198950 | 8/1988 |
| JP | 6087731 | 11/1994 |
| JP | 10084920 | 4/1998 |
| JP | 10150963 | 6/1998 |
| JP | 41-11-127775 | 5/1999 |
| JP | 2000023648 | 1/2000 |
| JP | 2000-125799 | 5/2000 |
| JP | 2000197446 | 7/2000 |
| JP | 2002-051695 | 2/2002 |
| WO | WO 2004/103131 A2 | 12/2004 |

OTHER PUBLICATIONS

U.S. Appl. No. 10/298,873: Final Office Action dated Dec. 23, 2010, including PTO-892 and references cited therin (6 pages).

EP Application No. 04811864.0: Supplementary European Search report dated Dec. 8, 2010 (6 pages).

Hoeft, et al., Food Science Department, University of Florida, 1973, "A Research Note—Cryogenic Freezing of Tomato Slices." *Journal of Food Science*, vol. 38, pp. 362-364.

Potter, N., *Food Science, Second Edition*. The AVI Publishing Co, Inc., Westport, CT., pp. 228-235, 1973.

\* cited by examiner

METHOD FOR DEHYDRO-ROASTING

CROSS REFERENCE TO RELATED APPLICATIONS

The present application is a continuation of U.S. patent application Ser. No. 10/978,340, filed Nov. 1, 2004, which has issued as U.S. Pat. No. 7,438,943, the disclosure of which is hereby incorporated by reference in its entirety.

FIELD OF INVENTION

The present invention relates to a method for roasting vegetables and fruit, and the resultant roasted food product. In particular, the present method partially dehydrates the vegetables or fruit followed by roasting the dehydrated product, to produce a dehydro-roasted food product.

BACKGROUND OF INVENTION

Currently, there is an expanding demand for vegetable and fruit products with roasted flavor and color characteristics. The uses for the resultant products are targeted towards food service, food manufacturing, and food ingredient companies, for various food applications, such as pre-cooked meals and toppings for fast food products. Such products will have roasted characteristics, long term storage capability, comparatively high flavor retention, and minimal syneresis. Roasted products can further be frozen for transportation and shipped in bags as frozen and ready to use. When the bag is opened, after thaw, there should be a minimal amount of water present in the bag.

Traditionally, to roast a vegetable or fruit, such as an onion, it was necessary to expose the onion to a heating device for a prolonged exposure until the roasted characteristics such as roasted flavor and coloring developed. Most natural or untreated vegetable or fruit products typically have high moisture content (above 90% moisture). The comparatively high moisture content increases the exposure time required, in traditional roasting devices, to produce the resultant roasted characteristics in the vegetable or fruit. Because traditional roasting methods require extended exposure to the flame, there is a higher amount of fuel consumption, resulting in higher overall costs for producing the roasted product. As such, it is desired to have a method for producing large quantities of roasted vegetable or fruit food products that are not labor-intensive and do not require extended exposure to the roasting device.

Current methods employed in the industry use a heating device to roast the fresh vegetable or fruit followed by individually quick freezing (IQF) or refrigeration. This traditional roasting method requires extending exposure to the heating device before the food particle develops suitable roasted appearance, flavor, aroma, and texture. As a result of the extended exposure to the heating element, increased fuel consumption is required to power the heating element and whereby causing a decrease in industrial efficiency. Additionally, the roasted food product of traditional roasting methods lack consistency because increased exposure to the flame can cause uneven surface charring of the food product and inhibit a uniform roasted flavor and texture. The prolonged exposure to the flame can result in the outer surface being charred or burnt before the interior flesh of the food product can produce the roasted flavor. The uneven charring and burnt surface decreases the appeal for consumers because of the residual burnt or carbon flavor associated with a food product that has been overcooked. As such, it is desired to have a method for rapidly exposing a vegetable or fruit food product to a roasting device to form a resultant roasted food product with uniform concentrated flavors, increased consumer appeal, and increased roasting efficiencies due to reduced heating exposure.

Another problem associated with traditional processed roasted vegetable and fruit food products that are frozen for future use, is the loss of cell wall integrity leading to syneresis upon thawing. Syneresis causes a typical frozen roasted vegetable or fruit food product to exhibit an undesirable mushy texture upon thawing. Syneresis is a result of cell wall degradation that leads to leaching of moisture typically contained within the cell of a vegetable or fruit. Traditional IQF roasted vegetable and fruit food products exhibit elevated moisture levels, which lead to cell structure degradation when the consumer subsequently thaws the frozen processed roasted vegetable or fruit food product. Thus, it is further desired to have a method that can produce a roasted vegetable or fruit food product with robust roasted flavor, minimal syneresis, increased cell wall integrity, and decreased moisture content.

SUMMARY OF INVENTION

The present invention relates to a method for producing roasted vegetable and fruit food products that have characteristics typically associated with roasted food products, such as roasted, grilled, or smoked flavor and appearance. The method is unique, because traditional roasting methods required exposure to a heating element, such as a flame, for an extended period of time to produce the roasted food product.

In the present method the vegetables and fruits, hereafter both vegetables and fruits are referred to as "vegetable", are initially partially dehydrated to remove a portion of the indigenous moisture, which decreases the amount of time required for roasting and increases the robust roasted flavor of the final roasted food product. Removing an amount of the moisture from the selected vegetables before roasting has not been previously utilized in the food industry. A portion of the indigenous moisture can be removed in conventional fixed bed convection air drying devices before exposure to the high temperature roasting apparatus. The partially dried vegetables require comparatively less exposure to a heating element than the traditional non-dried vegetable to produce the roasted food product. Advantageously, a roasted vegetable food product is produced that has a roasted flavor and desirable color. Subsequent drying, freezing, or preservative techniques can also be employed. Rapid heating results in increased efficiency by reducing the required exposure time to a heating element in the roasting apparatus. This translates into a decrease in time and fuel consumption to produce a roasted food product. In addition, the method results in production of a uniquely roasted food product with concentrated flavors and reduced syneresis.

The method is initiated by obtaining an amount of a vegetable, the vegetable can be selected from the group consisting of but not limited to onions, red bell peppers, green bell peppers, yellow bell peppers, zucchini, squash, asparagus, olives, beans, chili peppers, corn, cilantro, broccoli, eggplant, mushrooms, tomatoes, and combinations thereof. The vegetables are then cleaned and reduced in size to produce vegetable pieces. The vegetable pieces are dried to produce a partially dehydrated product where the moisture level has been reduced by between 10% and 65% by weight prior to roasting. The amount of moisture removed will depend on the vegetable selected.

The partially dried vegetable is exposed to a heating element, such as a flame, for a period of time sufficient to produce a dehydro-roasted vegetable food product. Optionally, a branding step can be included.

Additionally, drying steps can be performed after roasting, if necessary, to produce a dehydro-roasted food product with a significantly reduced moisture level. Such additional steps are designed to remove additional moisture or to allow the dehydro-roasted vegetable food product to be shelf stable. In the alternative, the dehydro-roasted vegetable can be frozen after the roasting step or additionally dehydrated and frozen to produce a frozen product. Optionally, agents for suppressing microbial and fungal activity can be added, to provide for shelf stability.

The present invention is advantageous because it relates to an industrial process, whereby large quantities of vegetables can be treated and roasted. In particular, the traditional method, which requires extended exposure to a heating element, is made more efficient by reducing heating time. The present method allows for the mass production of thousands of pounds of vegetables in a day at a significantly higher production rate, resulting in increased pounds/labor per hour. This is a continuous process, so that a continuous treatment may occur. The method allows the preparation of a roasted vegetable food product to occur in a reduced amount of time with the development of a robust full roasted flavor and color that would not occur as rapidly or fully without the included pre-dehydration step in the process.

DETAILED DESCRIPTION

Figure 1A:
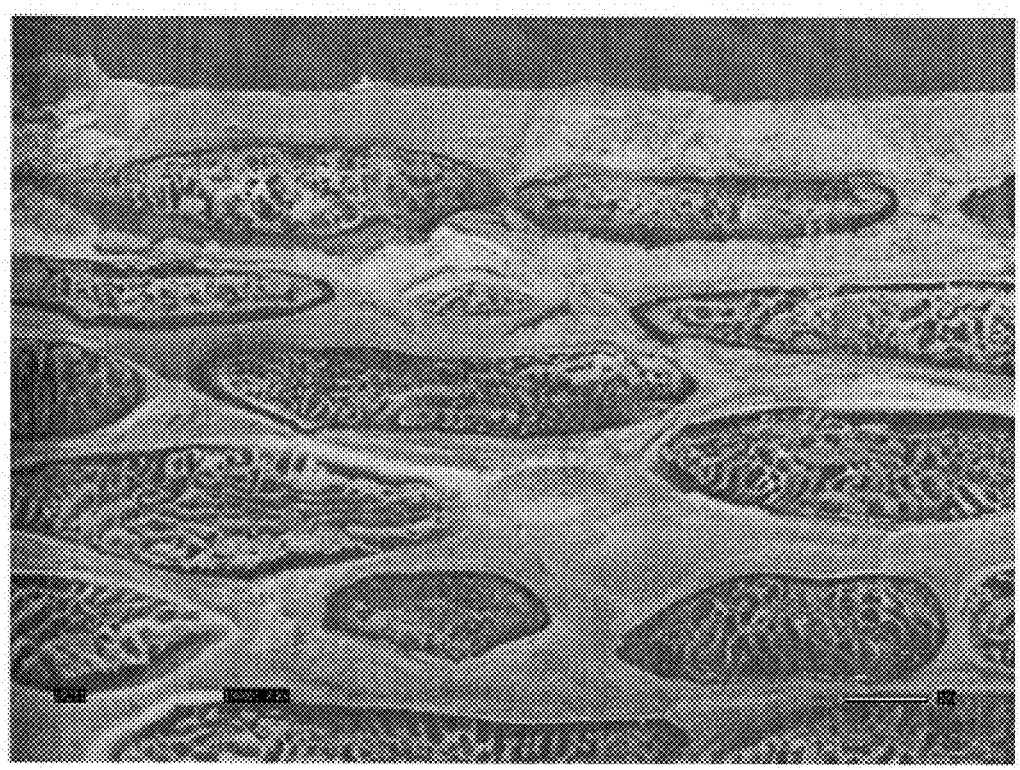
FIG. 1A is a digital image of the thawed dehydro-roasted bell pepper that demonstrates cell wall integrity on the outer surface of the cell.

The present invention relates to a method for roasting, grilling, smoking, or any method synonymous with cooking vegetables and fruit, and the resultant dehydro-roasted vegetable or fruit food product. Fruits and vegetables including but not limited to onions, red bell peppers, green bell peppers, yellow bell peppers, zucchini, squash, asparagus, olives, beans, chili peppers, corn, cilantro, broccoli, eggplant, mushrooms, and tomatoes can be treated to produce a dehydro-roasted food product. In particular, the present invention relates to a method, whereby large quantities of vegetables are dried and more preferable partially dehydrated and then roasted with heating elements, preferably a series of flames. Partially drying the vegetables produces a vegetable that is more amenable to roasting, and will develop increased flavor development, aroma, appearance, and texture in less roasting time, compared to traditional roasting methods. Optionally the vegetables are reduced in size and branded to produce the appearance associated with a roasted product. The partial drying of the vegetable combined with the roasting process results in a food product with a robust roasted flavor, minimal syneresis, increased cell wall integrity, and decreased moisture content.

The present method is initiated by obtaining a single vegetable, or a large quantity of vegetables. The vegetables can be selected from but not limited to onions, red bell peppers, green bell peppers, yellow bell peppers, zucchini, squash, asparagus, olives, beans, chili peppers, corn, cilantro, broccoli, eggplant, mushrooms, tomatoes, and combinations thereof. Any amount of vegetables can be treated; however, it is preferred to treat large quantities, as this can be part of an industrial process. Large quantities of vegetables, 3000 pounds/hour to 5000 pounds/hour can be treated. The vegetables can be prepared as part of a batch process or a continuous process.

Once the vegetable or vegetables are obtained, they are optionally cleaned and reduced in size to produce vegetable pieces. The cleaning and size reduction process is initiated by removing seeds, cores, and other products not desired for consumption. If onions are treated, the skins are peeled and the undesirable tops, roots, and root plate material are removed. If peppers are treated, the peppers are cored to remove the undesirable center, but special care is taken to not damage the remaining pepper.

Optionally, after cleaning, the vegetables will be cut, diced, chopped, or sliced to produce a vegetable food product. If the vegetables are already cut or reduced in size, then such a step is not necessary. Any of a variety of commercial chopping devices can be used to slice, cut, dice, or chop the vegetables. The preferred chopping devices are either a Urschel Model J Dicer or a Urschel Model G Dicer. The size of the resultant product is determined in part by the desired characteristics for the finished product. The diced or sliced parts can range in size from minced or small diced particles having a size equal to approximately ⅛ inch cubed, to slices, which are equal to either the length or width of the vegetable. Preferably, the vegetables are cut or chopped into slices ⅜ inch wide and as long as the length of the vegetable.

After the vegetables have been reduced in size through cutting, chopping, dicing, or slicing they are dried. Any method known in the industry for moisture removal can be used, such as centrifugation, air drying, or vacuum drying. Preferably, the vegetable food products are placed in a dryer to decrease the moisture content and produce a partially dehydrated vegetable food product. The partial dehydration of the vegetable food product is achieved by contacting forced heated air with the vegetable food product to remove the "free moisture". By reducing the moisture content of the vegetable food product a partially dehydrated vegetable food product is produced. Removal of the free moisture increases the vegetables' sensitivity to the roasting process, which enhances the roasting characteristics, such as flavor, aroma, texture, and appearance, of the roasted vegetable food product. Additionally, removal of the free moisture decreases the exposure time to the heating element. A variety of devices can be used to dry the vegetable food products such as, belt dryers, jet zone dryers, fluid bed dryers, tray dryers, an impingement oven, evaporative or continuous vacuum dryer, and combinations thereof. A variety of temperatures, air speed, and times can be used. The preferred dryer is a fixed bed convection air dryer. The most preferred device for use in the present method is a Proctor & Schwartz Dryer.

The preferred temperature for use in the convection air dryer, as well as most other air dryer systems, will range between about ambient and about 350° F. More preferably, the temperature will range between about 140° F. and about 150° F. Any temperature can be used, however, as long as a sufficient air temperature is achieved to partially dehydrate the vegetable food products. The vegetable food products are partially dried until the moisture content of the vegetable food products has been reduced. Typically, the vegetable food products are partially dried to remove the free moisture found in the vegetable food product.

The amount of moisture removed will depend on the free moisture typically found in the vegetable food product. Free moisture is defined as the amount of moisture that can be extracted from the vegetable before cells of the vegetable collapse or shrivel. The vegetable drying cycle is divided into two periods, "Constant Rate" drying and "Falling Rate" drying. During the constant rate period the free moisture is removed from the vegetable and produces water vapor, which causes an evaporative cooling effect that maintains the vegetables temperature. Because the evaporative cooling effect maintains the temperature of the vegetable, there is minimal cellular damage, such as collapse or shriveling. During the constant drying rate period the mass transfer rate of moisture to the surface of the vegetable from the center is constant with the evaporation rate of moisture from the surface of the vegetable. Resulting in minimum "case hardening" and cell wall damage. Case hardening occurs, when the outer surface dries faster than the interior flesh of the vegetable. This causes a thick shell to develop on the outer surface of the vegetable and results in moisture being trapped within the vegetable. As soon as the free moisture is removed from the vegetable, the falling rate drying period begins. In the falling rate drying period, the mass transfer rate of moisture from the center of the vegetable to the surface is less than the evaporation rate of water vapor from the surface of the vegetable. This results in case hardening and cell wall damage. In the falling rate period the evaporative cooling effect is lost, causing the product temperature to climb and cellular changes, such as collapse and shriveling to occur. Typically, the vegetable food products are dried to remove the free moisture. Removal of the free moisture decreases the overall vegetable weight, and increases the solid concentration in the vegetable. The drying step will preferably reduce the total moisture level from between 10% and 65% by weight of the starting vegetable moisture level.

If onion pieces are selected, they are placed in the fixed bed dryer reducing 35% by weight of the total moisture level and reducing the total weight of the onion pieces. Reducing the total moisture level increases the solid concentration of the onion pieces from between 7% to 9% to between 10.5% to 13.8%. If peppers are selected, the pepper pieces, including yellow and red, are placed in the fixed bed dryer reducing 50% by weight of the total moisture level and reducing the total weight of the yellow and red pepper pieces. Reducing the total moisture level increases the solid concentration of the yellow and red pepper pieces from between 9% to 10% to between 18% to 20%. If green peppers are selected, green pepper pieces are placed in a fixed bed dryer reducing 45% by weight of the total moisture level and reducing the total weight of the green peppers. Reducing the total moisture level increases the solids concentration of the green pepper pieces from between about 5% to 7% to between about 10% to 14%. Optionally, if green peppers are selected a step may be required to assure the green color retention of the final product. Any method known in the industry can be employed.

Optionally, the partially dried vegetable food products are branded. The branding device imparts grill marks to the surface of the partially dried vegetable food product. The preferred brander is a Heat & Control, Model RB/Sear Rotary Brander & Searer Combination unit. Any method that produces grill marks on the vegetable food product can be used. The most preferred method of producing grill marks on the vegetable food product is to place the vegetable food products on a conveyor belt. Preferably, a narrow mesh belt is used to help facilitate the transportation of the vegetable food product and prevent the vegetable food product from falling through. The vegetable food products are then transported via the conveyor belt. The conveyor belt transports the vegetable food products at a speed of between 10 FPM (feet per minute) to 25 FPM. As the vegetable products are transported down the conveyor belt the brander is positioned to contact the vegetable food products. Preferably, the vegetable food products are positioned as a single layer on the conveyor and are passed beneath the brander where the brander exerts pressure equal to about 1 pound per $ft^2$ at a temperature of about 1200° F. to 1500° F. to the surface of the vegetable food products.

After partial drying, the vegetable food products are exposed to a heating element. Preferably, the partially dehydrated vegetable food product is roasted. Roasting is achieved by exposing the partially dried vegetable food product to heat, such as a flame, from a heating element. Optionally, the partially dehydrated vegetable food product can be cooked by any means known in the industry, including but not limited to grilling, fire roasting, sautéing, broiling, steaming, or combinations thereof. Because of the decreased moisture level in the partially dehydrated vegetable food product, the vegetable requires less exposure to a heating element to produce the roasted vegetable food product. Whereby, increasing efficiency by lowering the energy costs required for producing the roasted vegetable. Roasting the partially dried vegetable produces a food product with characteristics that when compared to typical roasted vegetables has enhanced roasted characteristics such as flavor, aroma, texture, and appearance. Less exposure to the heating element is beneficial because it increases the efficiency by lowering the amount of energy required to produce the roasted product and decreases the likelihood that portions of the vegetable will be roasted too long leading to burnt vegetable food products.

Any of a variety of heating elements can be used to roast the partially dried vegetable food product. Preferably, the heating element will produce a temperature of about 1500° F. to 2000° F. to contact the surface of the vegetable food products. Preferably, the partially dried vegetable food products pass through a roasting cycle, where the vegetable food products are allowed to contact a flame or a series of flames. Typically, the roasting cycle includes five flames or less. Optionally, the heating element can be any method that heats the vegetable food product, for example convection ovens, heated air, laser, impingement oven, and combinations thereof. The contact period with the flame or flames is between 0.25 seconds to 15 seconds. Preferably, the vegetable food products are transported via the conveyor belt through a series of flames which roasts the vegetable food product. The vegetable food products pass beneath a series of one or more flames. This produces a dehydro-roasted vegetable food product. Optionally, a rotation step may be included followed by exposure to additional flames. The rotation of the vegetable food product ensures uniform exposure to the flame and enhanced roasting characteristics.

In an optional embodiment after the vegetables have been reduced in size through cutting, chopping, dicing, or slicing they are first roasted, to produce roasted vegetable pieces. The vegetable pieces are optionally branded, to impart grill marks on the vegetable pieces. The roasted vegetables are further partially dried to form a backward dehydro-roasted vegetable food product. The vegetable pieces obtained after being reduced in size are roasted by exposure to a heating element as previously disclosed. After, the vegetable pieces have been roasted, they are partially dried according to the specifications and techniques previously discussed to produce a backward dehydro-roasted vegetable food product.

Once the dehydro-roasted vegetable food product or backward dehydro-roasted vegetable food product has been produced, it can be further treated for long term storage. Hereinafter both dehydro-roasted vegetable food product and backward dehydro-roasted vegetable food product are referred to as "roasted vegetable food product". The additional treatment includes any of a variety of methods. The first is to freeze the roasted vegetable food product. Preferably, the roasted vegetable food product is exposed to a freeze process to produce individual frozen roasted vegetable pieces. The frozen roasted vegetable pieces are "free flowing" frozen pieces. The preferred temperature for convection freezing the food product ranges between about −20° F. and −50° F. Dependent on the food product, the freezing time is between 1 to 20 minutes. Preferably, the freezing time is 1 to 5 minutes. The frozen product is then available for use, whereby the product is simply thawed and consumed. In a conventional fluid bed freezer, the freezing time and rate are dependent on airflow and air temperature, as well as the material being frozen. In the alternative, a forced air freezer can be used that has an air temperature as low as −50° F., with high airflow creating IQF pieces in 5-10 minutes. Liquid immersion freezers can be used. The immersion freezer contacts the product with a refrigerant solution, such as Liquid Nitrogen, which freezes the product almost instantaneously. As such, the roasted vegetable food product prepared from this process can be rapidly or slowly frozen, using any number of freezing techniques. Because of the decreased moisture level in the roasted food product, the food product requires less exposure to the freezing treatment. The roasted food product will freeze more rapidly compared to food products that were not partially dehydrated before roasting and subsequent freezing.

Optionally, the roasted food product can be further dehydrated by any means known in the industry to remove the remaining moisture in the food product, whereby producing a shelf stable dried roasted vegetable food product.

The vegetables suitable for use in the present process may include, but are not limited to onions, red bell peppers, green bell peppers, yellow bell peppers, zucchini, squash, asparagus, olives, beans, chili peppers, corn, cilantro, broccoli, eggplant, mushrooms, tomatoes, and combinations thereof.

The entire process recited herein can be a batch or continuous process. It can also be a combination of the batch and the continuous processes.

EXAMPLES

Example 1

Dehydro-roasted yellow onions were produced by obtaining an amount of fresh whole onions. The onions were treated manually with knives to remove the roots, root plate, tops, and skins. The onions were then cleaned with running water. After cleaning, the onions were put through conventional slicing equipment (Urschel Model G Dicer) whereby the onions were sliced at a length as long as possible and a width of $3/8^{th}$ of an inch. The sliced onions were placed in a fixed bed convection dryer (Proctor & Schwartz Dryer), having an air temperature of about 140° F. to about 150° F. The onion slices were dried until the moisture level was reduced by approximately 25% by weight of the onion slices. Analysis was conducted, where it was determined that solids in the onion slices increased from 10.7% to 13.8%.

The partially dehydrated onion slices were then transferred to a narrow mesh conveyor belt for branding and roasting. The onion slices were transported on the belt at a speed set at about 10 FPM (feet per minute). The onion slices were branded on a single side with a brander device (Heat and Control, Model RB/Sear Rotary Brander & Searer Combination unit) exerting pressure at about 1 pound per $ft^2$, with a temperature of about 1400° F. to about 1500° F. Next the partially dried onion slices were roasted by passing under a heating element (flame jets) via a conveyer belt at about 10 FPM. The flame jets operate at a temperature of between 1500° F. to about 2000° F. and based on the speed of the conveyor belt the onion slices are exposed to the flame jets for approximately 1.25 seconds.

The dehydro-roasted onions were then frozen to form a frozen product.

Example 2

Dehydro-roasted red peppers were produced by obtaining an amount of fresh red bell peppers. The red peppers were treated manually with knives to remove the cores with extra care taken to not break up the pepper meat during the coring process. After cleaning, the red peppers were sliced with conventional slicing equipment (Urschel Model J Dicer), whereby the red peppers were sliced into strips with a width of $3/8^{th}$ of an inch and a length as long as possible. The sliced red peppers were placed in a fixed bed convection dryer (Proctor & Schwartz Dryer), having an air temperature of about 140° F. to about 150° F. The red pepper slices were dried until the moisture level was reduced by approximately 50% by weight of the red pepper slices. Analysis was conducted, where it was determined that solids in the red pepper slices increased from 9.5% to 17.5%.

The partially dehydrated red pepper slices were transferred to a narrow mesh conveyor belt for branding and roasting. The red pepper slices were transported on the belt at a speed of about 10 FPM. The red pepper slices were branded on a single side with a branding device (Heat and Control, Model RB/Sear Rotary Brander & Searer Combination unit) exerting pressure at about 1 pound per $ft^2$, with a temperature of about 1400° F. to about 1500° F. Next the partially dried red pepper slices were roasted by passing under a heating element (flame jets) via a conveyer belt at about 10 FPM. The flame jets operate at a temperature of about 1500° F. to about 2000° F., and based on the speed of the conveyor belt the red peppers are exposed to the flame jets for approximately 1.25 seconds.

The dehydro-roasted red peppers were then frozen to form a frozen product.

Example 3

Dehydro-roasted zucchini squash were produced by obtaining an amount of fresh zucchini squash. The zucchini squash were treated manually with knives to remove the undesirable parts. After cleaning, the zucchini squash were sliced with conventional slicing equipment (Urschel Model OV Dicer), whereby the zucchini squash were cross-cut into pieces with a width of $3/8^{th}$ of an inch. The sliced zucchini squash were placed in a fixed bed convection dryer (Proctor & Schwartz Dryer) having an air temperature of about 140° F. to about 150° F. The zucchini squash pieces were dried until the moisture level was reduced by approximately 45% by weight of the zucchini squash pieces. Analysis was conducted, where it was determined that solids in the zucchini squash pieces increased from 6.5% to 13.3%.

The partially dehydrated zucchini squash pieces were transferred to a narrow mesh conveyor belt for branding and roasting. The zucchini squash pieces were transported on the belt at a speed of about 10 FPM. The zucchini squash pieces were branded on a single side with a branding device (Heat and Control, Model RB/Sear Rotary Brander & Searer Combination unit), exerting pressure at about 1 pound per $ft^2$, with a temperature of about 1400° F. to about 1500° F. Next the partially dried zucchini pieces were roasted by passing under a heating element (flame jets) via a conveyer belt at about 10 FPM. The flame jets operate at a temperature of about 1500°

F. to about 2000° F., and based on the speed of the conveyor belt the zucchini is exposed to the flame jets for approximately 1.25 seconds.

The dehydro-roasted zucchini were then frozen to form a frozen product.

Example 4

Samples of yellow onions were trimmed, washed, and diced to yield slices to be sub-divided into sample groups. The groups were then processed to produce dehydro-roasted samples, backward dehydro-roasted samples (roasted first then partially dried), and roasted IQF samples (roasted and no drying). The samples were then compared for thawed moisture loss (syneresis), recovery comparison, and sensory analysis.

Products were obtained and treated as listed below.

A. Yellow Onion—Dehydro-Roasted
1. Trim and clean yellow onions (100 lbs. of fresh vegetables were used for each method);
2. Run onions through G dicer set for strips as long as possible×⅜";
3. Place product on a fixed bed convection air dryer, and air dry using P&S at 140° F. to 150° F. until the moisture level is reduced by 25%;
4. Pass the partially dried onion slices through a brander once and heating device once (gas flame)
5. Lightly blanch on lab blancher—then cool to ambient;
6. Freeze product to produce frozen pieces;
7. Check weight of frozen product and check Vacuum Oven (VO) solids (a standard industry technique to measure solids content); and,
8. Conduct sensory comparison.

B. Yellow Onion—Backward Dehydro-Roasted
1. Trim and clean yellow onions;
2. Run onions through G dicer set for strips as long as possible×⅜";
3. Pass onion slices through a brander once and seven times (7×) through a heating device (gas flame);
4. Place product on a fixed bed convection air dryer, and air dry using P&S at 140° F. to 150° F. until the moisture level is reduced by 25% of the original diced weight;
5. Lightly Blanch on lab blancher—then cool to ambient;
6. Freeze product to produce frozen pieces;
7. Check weight of frozen product and check VO solids; and,
8. Conduct sensory comparison.

C. Yellow Onion—IQF Roasted
1. Trim and clean yellow onions;
2. Run onions through G dicer set for strips as long as possible ×⅜";
3. Blanch on lab blancher—then cool;
4. Pass onion slices through a brander once and seven times (7×) through a heating device (gas flame);
5. Freeze onion slices to produce frozen pieces;
6. Check weight of frozen product and check VO solids; and,
7. Conduct sensory comparison.

The products from above were analyzed for syneresis and recovery comparison. Equal weights for each vegetable were processed through each roasting process. An equal amount of starting weight of fresh vegetables (100 lbs.) were used for each of the roasting processes. Throughout the process the products were measured to prepare the table prepared below. Start weight is the vegetable unaltered. Diced weight is the weight after the product has been chopped. Roasted weight is the weight after the product has been roasted, and frozen weight is the weight after freezing. Frozen solids is the % by weight of the solids in the product after freezing. Recovery is the % of the total solids recovered. Syneresis is determined by measuring the % by weight of moisture lost after the vegetable has been roasted, frozen, and then thawed. The products were allowed to thaw/temper for 5 hours at ambient condition between two absorbent napkins. The thawed product was then weighed and % moisture loss by weight was calculated. After producing the food products the below data was collected.

| Roasted Frozen Vegetables For Sensory Comparison Calculated Recovery Comparisons | | | |
|---|---|---|---|
| | Onions IQF Roasted (Roast & No Dry) | Onions Dehydro-Roasted (Dried Then Roasted) | Onions Bkwd Dehyro-Roasted (Roast Then Dry) |
| Start Wt | 100 lbs | 100 lbs | 100 lbs |
| Trimmed Wt | 88 lbs | 88 lbs | 88 lbs |
| Diced Wt | 86 lbs | 86 lbs | 86 lbs |
| Blanched Wt | 82 lbs | | |
| Roasted Wt | 57 lbs | 58 lbs | 64 lbs |
| Frozen Wt | 53 lbs | 57 lbs | 60 lbs |
| Frozen Recovery | 53% | 57% | 60% |
| Start Solids | 10.7% | 10.7% | 10.7% |
| Frozen Solids | 9.8% | 13.3% | 13.8% |
| Syneresis | 30.0% | 21.2% | 27.6% |
| Diced Solids Wt (% Sol × Dic Wt) | 9.2 lbs | 9.2 lbs | 9.2 lbs |
| Frozen Solids Wt (% Sol × Froz) | 5.2 lbs | 7.6 lbs | 8.3 lbs |
| Solid Loss Est | 43.6% | 17.6% | 10.0% |
| If Thaw syneresis loss is considered in overall recovery | | | |
| Est Wt After Syneresis | 37 | 45 | 43 |
| Recovery After Thaw | 37.1% | 44.9% | 43.4% |
| From the viewpoint of a customer buying 100 pounds of product. | | | |
| Customers Thaw Recovery | | | |
| Customers Start Wt | 100 | 100 | 100 |
| Customers Thawed Wt | 70 | 79 | 72 |

The data above illustrates the distinctive characteristics found in the CM roasted onions. In IQF roasted onions, 30 lbs. of water is lost due to syneresis from a 100 lb. frozen weight. In dehydro-roasted onions, 21 lbs. of water is lost due to syneresis from a 100 lb. frozen weight. Resulting in 30% less syneresis in dehydro-roasted vs. IQF roasted onions, and 9 lbs. of additional thawed onions for the consumer. Syneresis in a roasted vegetable causes the roasted vegetable product to "weep," which is the leakage of moisture from the food product due to cellular degradation. Cellular degradation combined with loss of moisture will cause the vegetable food product to be watery and mushy. Since the dehydro-roasted onion exhibits less syneresis and the recovery after thawing is increased, the dehydro-roasted onion will be a product with less cellular degradation and a firmer (chalky) texture.

Example 5

Samples of red bell peppers were trimmed, washed, and diced to yield slices to be sub-divided into sample groups. The groups were then processed to produce dehydro-roasted samples, backward dehydro-roasted samples, and roasted IQF samples. The samples were then compared for thawed moisture loss (syneresis), recovery comparison, and sensory analysis.

Products were obtained and treated as listed below.

A. Red Bell Pepper—Dehydro-Roasted
 1. Trim and clean red peppers (100 lbs. of fresh vegetables were used for each method);
 2. Run red peppers through J dicer set for strips as long as possible x⅜";
 3. Place product on a fixed bed convection air dryer, and air dry using P&S at 140° F. to 150° F. until the moisture level is reduced by 50%;
 4. Pass dried partially dried pepper slices once through a brander and once through a heating device (gas flame);
 5. Blanch on lab blancher—then cool to ambient;
 6. Freeze product to produce frozen pieces;
 7. Check weight of frozen product and check VO solids; and,
 8. Conduct sensory comparison.

B. Red Bell Pepper—Backward Dehydro-Roasted
 1. Trim and clean red peppers;
 2. Run red peppers through J dicer set for strips as long as possible x⅜";
 3. Pass pepper slices once through a brander and five times (5x) through a heating device (gas flame);
 4. Place product on a fixed bed convection air dryer and air dry using P&S at 140° F. to 150° F. until the moisture level is reduced by 50% of the original diced weight;
 5. Blanch on lab blancher—then cool to ambient;
 6. Freeze product to produce frozen pieces;
 7. Check weight of frozen product and check (VO) solids; and,
 8. Conduct sensory comparison.

C. Red Bell Pepper—IQF Roasted
 1. Trim and clean red peppers;
 2. Run red peppers through J dicer set for strips as long as possible x⅜";
 3. Blanch on lab blancher—then cool to ambient;
 4. Pass pepper slices through a brander once and five times (5x) through a heating device (gas flame);
 5. Freeze product to produce frozen pieces;
 6. Check weight of frozen product and check (VO) solids; and,
 7. Conduct sensory comparison.

The products from above were analyzed for syneresis and recovery comparison. Equal weights for each vegetable were processed through each roasting process (dehydro-roasting, backward dehydro-roasting, and IQF roasting). Equal amounts of 100 lbs. of fresh vegetables were the starting weight used for each of the roasting processes. Throughout the process the products were measured to prepare the table prepared below. After producing the food products the below data was collected.

Roasted Frozen Vegetables For Sensory Comparison
Calculated Recovery Comparisons

|  | Red Pepper IQF Roasted (Roast & No Dry) | Red Pepper Dehydro-Roasted (Dried Then Roasted) | Red Pepper Bkwd Dehyro-Roasted (Roast Then Dry) |
|---|---|---|---|
| Start Wt | 100 lbs | 100 lbs | 100 lbs |
| Trimmed Wt | 84 lbs | 84 lbs | 84 lbs |
| Diced Wt | 83 lbs | 83 lbs | 83 lbs |
| Blanched Wt | 77 lbs | | |
| Roasted Wt | 52 lbs | 37 lbs | 40 lbs |
| Frozen Wt | 48 lbs | 36 lbs | 37 lbs |
| Frozen Recovery | 48% | 36% | 37% |
| Start Solids | 9.5% | 9.5% | 9.5% |
| Frozen Solids | 11.4% | 17.5% | 18.4% |
| Syneresis | 31.6% | 13.6% | 13.6% |
| Diced Solids Wt (% Sol x Dic Wt) | 7.9 lbs | 7.9 lbs | 7.9 lbs |
| Frozen Solids Wt (% Sol x Froz) | 5.5 lbs | 6.3 lbs | 6.8 lbs |
| Solid Loss Est | 30.6% | 20.1% | 13.9% |
| If Thaw syneresis loss is considered in overall recovery | | | |
| Est Wt After Synereisis | 33 | 31 | 32 |
| Recovery After Thaw | 32.8% | 31.1% | 32.0% |
| From the viewpoint of a customer buying 100 pounds of product. | | | |
| Customers Thaw Recovery | | | |
| Customers Start Wt | 100 | 100 | 100 |
| Customers Thawed Wt | 68 | 86 | 86 |

Figure 1B:
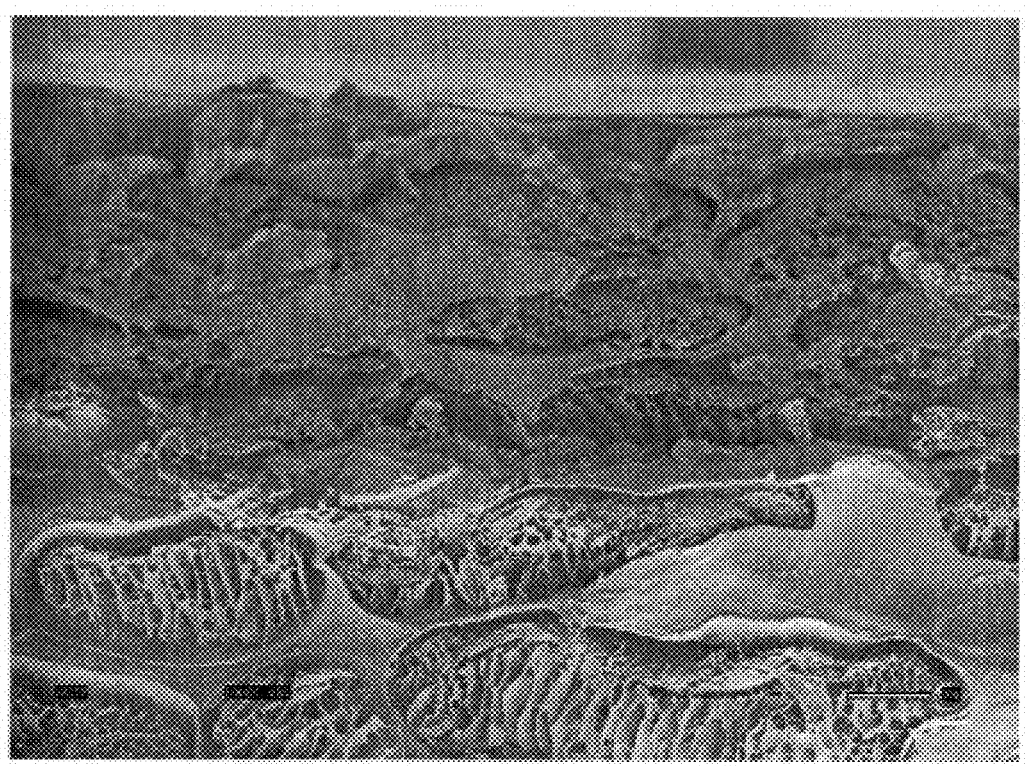
FIG. 1B is a digital image of an IQF roasted red bell pepper that demonstrates cell wall degradation that leads to syneresis. (An IQF roasted red bell pepper is representative of roasted red bell peppers currently sold on the market).

As shown in FIGS. 1A and B the effects of syneresis at the cellular level was compared between dehydro-roasted and IQF roasted red bell peppers. The dehydro-roasted and IQF samples were prepared according to the steps outlined above. Subsequent to freezing the sample pieces were fractured under liquid nitrogen to prepare the sample for viewing. The samples were then held at room temperature until thawed. The thawed samples were then prepared and transferred to the microscope stage. The samples were viewed with a JEOL JSM-840 SEM operating at 4 kV. Digital images were captured at various magnifications. FIGS. 1A and B are at a magnification of 1000x. As can be seen in FIG. 1A, the cell structure of the dehydro-roasted red bell pepper remains intact, with little or no cell degradation. Comparatively, FIG. 1B displays the IQF roasted red bell pepper that exhibits extensive cellular degradation on the epithelial surface, which leads to an increase in moisture loss from the collapsed cells and an increase in syneresis when compared to the dehydro-roasted red bell pepper.

The following observations regarding the distinctive characteristics of the dehydro-roasted vegetables are illustrated in the table above and FIG. 1. A comparison of the data reveals that for 100 lbs. of frozen weight, IQF roasted red pepper lost 32 lbs. of water due to syneresis, while dehydro-roasted red peppers lost 14 lbs. of water. This results in 56% less syneresis in the dehydro-roasted red pepper compared to the IQF roasted red pepper. A decrease in syneresis translates into an additional 18 lbs. of thawed red peppers for the customer. This reduction in thaw loss would be an advantage to a customer utilizing this product. Since the dehydro-roasted red peppers exhibit less syneresis and the recovery after thawing is increased, the dehydro-roasted red pepper will be a product with less cellular degradation and a firmer chalky texture.

Example 6

Samples of zucchini were trimmed, washed, and diced to yield slices to be sub-divided into sample groups. The groups were then processed to produce dehydro-roasted samples, backward dehydro-roasted samples, and roasted IQF samples. The samples were then compared for thawed moisture loss (syneresis), recovery comparison, and sensory analysis.

Products were obtained and treated as listed below.

A. Zucchini Squash—Dehydro-Roasted
1. Trim and clean zucchini (100 lbs. of fresh vegetables were used for each method);
2. OV-slice zucchini into slices ⅜" thick;
3. Place product in a fixed bed convection air dryer and dry using heated air at 140° F. to 150° F. until the moisture level is reduced by approximately 50%;
4. Pass dried partially dried zucchini slices once through a brander and once through a heating device (gas flame);
5. Blanch on lab blancher—then cool to ambient;
6. Freeze zucchini slices to produce individual frozen slices;
7. Check weight of frozen product and check VO solids; and,
8. Conduct sensory comparison.

B. Zucchini Squash—Backward Dehydro-Roasted
1. Trim and clean zucchini;
2. OV-slice zucchini into slices ⅜" thick;
2. Pass zucchini slices through a branding wheel one time and five times (5×) through a heating device (gas flame);
3. Place product on a fixed bed convection air dryer and dry using heated air at 140° F. to 150° F. until the moisture level is reduced, by 50% of original sliced weight;
4. Blanch on lab blancher—cool to ambient temperature;
5. Freeze zucchini slices to produce individual pieces;
6. Check weight of frozen product and check (VO) solids; and,
7. Conduct sensory comparison.

C. Zucchini Squash—IQF Roasted
1. Trim and clean zucchini;
2. OV-slice zucchini into slices ⅜" thick;
3. blanch on lab blancher—then cool;
4. Contact zucchini slices with a branding wheel one time and five times (5×)-through a heating device (gas flame);
5. Freeze zucchini slices to produce individual pieces;
6. Check weight of frozen product and check (VO) solids; and,
7. Conduct sensory comparison.

The products from above were analyzed for syneresis and recovery comparison. Equal weights for each vegetable were processed through each roasting process (dehydro-roasting, backward dehydro-roasting, and IQF roasting). Equal amounts of 100 lbs. of fresh vegetables were the starting weight used for each of the roasting processes. Throughout the process the products were measured to prepare the table prepared below. After producing the food products the below listed data was collected.

| Roasted Frozen Vegetables For Sensory Comparison Calculated Recovery Comparisons | | | |
|---|---|---|---|
| | Zucchini IQF Roasted (Roast & No Dry) | Zucchini Dehydro-Roasted (Dried Then Roasted) | Zucchini Bkwd Dehyro-Roasted (Roast Then Dry) |
| Start Wt | 100 lbs | 100 lbs | 100 |
| Trimmed Wt | 99 lbs | 99 lbs | 99 |
| Diced Wt | 99 lbs | 99 lbs | 99 |
| Blanched Wt | 86 lbs | | |
| Roasted Wt | 78 lbs | 57 lbs | 55 |
| Frozen Wt | 72 lbs | 52 lbs | 51 |
| Frozen Recovery | 72% | 52% | 51% |
| Start Solids | 6.5% | 6.5% | 6.5% |

| Roasted Frozen Vegetables For Sensory Comparison Calculated Recovery Comparisons (-continued) | | | |
|---|---|---|---|
| | Zucchini IQF Roasted (Roast & No Dry) | Zucchini Dehydro-Roasted (Dried Then Roasted) | Zucchini Bkwd Dehyro-Roasted (Roast Then Dry) |
| Frozen Solids | 8.0% | 13.3% | 12.6% |
| Syneresis | 46.8% | 19.6% | 25.2% |
| Diced Solids Wt (% Sol × Dic Wt) | 6.4 lbs | 6.4 lbs | 6.4 lbs |
| Frozen Solids Wt (% Sol × Froz) | 5.8 lbs | 6.9 lbs | 6.4 lbs |
| Solid Loss Est | 10.5% | 0% | 0% |
| If Thaw syneresis loss is considered in overall recovery | | | |
| Est Wt After Syneresis | 38 | 43 | 38 |
| Recovery After Thaw | 38.3% | 43.4% | 38.1% |
| From the viewpoint of a customer buying 100 pounds of product. | | | |
| Customers Thaw Recovery | | | |
| Customers Start Wt | 100 | 100 | 100 |
| Customers Thawed Wt | 53 | 80 | 75 |

The following observations regarding the distinctive characteristics of the dehydro-roasted vegetables are illustrated in the table above. The dehydro-roasted zucchini compared to the IQF roasted zucchini exhibited a decrease in syneresis and increase in recovery after thawing. Comparing the data reveals that for 100 lbs. of frozen weight zucchini, IQF roasted zucchini lost 47 lbs. of water due to syneresis, compared to dehydro-roasted zucchini losing only 20 lbs. of water. This results in 67% less syneresis in the dehydro-roasted zucchini compared to the IQF roasted zucchini. A decrease in syneresis translates into an additional 27 lbs. of thawed zucchini for the customer. Since the dehydro-roasted zucchini exhibits less syneresis and the recovery after thawing is increased, the dehydro-roasted zucchini will be a product with less cellular degradation and a firmer chalky texture.

Example 8

Descriptive Sensory Analysis

A side-by-side descriptive sensory analysis was performed by a panel consisting of six highly trained descriptive panelists testing for texture, flavor, appearance, and aroma. The panelists had more than 120 hours of descriptive training and average more than 2000 hours of testing experience.

The onions from Example 4 were analyzed, except commercially available Jon-Lin roasted IQF products were substituted for the IQF roasted products produced above. The substitution allows a comparison between roasted products currently on the market and the new products produced by dehydro-roasting (DR). The products were separated into samples that were coded with random 3-digit codes and served one at a time in 8 oz. foam bowls. The samples were allowed to come to room temperature before evaluation. The samples were scored and based on a 15-point scale with 0.5 point increments.

Data was analyzed using analysis of variance and t-test (LSD means comparison) at 95% confident level and at 90% confident level, to determine if significant differences ($p<0.05$ and $p<0.10$ respectively) was present for all pairs or products.

The results are as follows:

|  | Backward DR vs. IQF Onion | | | Backward DR vs. DR Onion | | | DR vs. IQF Onion | | |
|---|---|---|---|---|---|---|---|---|---|
|  | Backward | | | Backward | | | | | |
|  | Dr | IQF | LSD | DR | DR | LSD | DR | IQF | LSD |
| Appearance | | | | | | | | | |
| Deformation | 4.29 | 4.29 | Na | 4.29 | 5.04 | Na | 5.04a | 4.29b | 0.53** |
| Charred | 1.58b | 3.17a | 1.05** | 1.58 | 2.25 | Na | 2.25b | 3.17a | 0.53** |
| Ashy/Sooty | 3.00a | 1.21b | 1.32** | 3.00b | 7.71a | 2.37** | 7.71a | 1.12b | 3.68** |
| Texture | | | | | | | | | |
| Crispness | 5.00 | 4.88 | Na | 5.00a | 4.58b | <0.01 | 4.58 | 4.88 | Na |
| Firmness | 5.75 | 5.96 | Na | 5.75 | 5.38 | Na | 5.38 | 5.96 | Na |
| Fibrous | 5.83 | 5.88 | Na | 5.83 | 5.96 | Na | 5.96 | 5.88 | Na |
| Chalky | 1.04a | 0.25b | 0.79** | 1.04b | 1.79a | .053** | 1.79a | 0.25b | 0.53* |
| Aroma | | | | | | | | | |
| Yellow Onion ID | 4.58 | 6.00a | <0.01* | 4.58 | 4.38 | Na | 4.38b | 6.00a | 0.53* |
| Smoke | 1.13 | 0.75 | Na | 1.13 | 1.71 | Na | 1.71 | 0.75 | Na |
| Browned | 0.88b | 1.83a | 0.53* | 0.88b | 1.17a | 0.26** | 1.17b | 1.83a | 0.26* |
| Pungent | 4.00 | 5.17 | Na | 4.00 | 4.08 | Na | 4.08b | 5.17a | 1.06* |
| Flavor | | | | | | | | | |
| Yellow Onion ID | 5.58b | 7.83a | <0.01* | 5.58 | 5.54 | Na | 5.54b | 7.83a | 0.53* |
| Cooked | 6.21 | 6.42 | Na | 6.21b | 7.08a | 0.53* | 7.08a | 6.42b | <0.01* |
| Sweet Aromatics | 3.13 | 3.00 | Na | 3.13 | 3.33 | Na | 3.33a | 3.00b | <0.01* |
| Browned | 1.13 | 1.75 | Na | 1.13 | 0.79 | Na | 0.79b | 1.75a | 0.53* |
| Pungent | 4.79 | 5.58 | Na | 4.79 | 4.33 | Na | 4.33 | 5.58 | Na |
| Smoke | 1.58a | 1.00b | 0.53** | 1.58 | 2.25 | Na | 2.25a | 1.00b | 1.06* |
| Burnt | 0.75 | 1.25 | Na | 0.75 | 0.92 | Na | 0.92 | 1.25 | Na |
| Sweet | 1.58 | 1.58 | Na | 1.79b | 2.21a | <0.01* | 2.21a | 1.58b | 0.53* |
| Sour | 1.38 | 1.38 | Na | 1.38 | 1.42 | Na | 1.42 | 1.38 | Na |
| Bitter | 2.17 | 2.17 | Na | 2.33 | 2.54 | Na | 2.54 | 2.17 | Na | abc: Numbers with different letters within an attribute of each sample set are significantly different.
*LSD, the smallest difference between two means that would result in a significant difference at the 95% confidence level.
**LSD, the smallest difference between two means that would result in a significant difference at the 90% confidence level.

The following observations regarding the sensory analysis are displayed in the table above. The data illustrates that a superior flavor is produced with the dehydro-roasted method. The dehydro-roasted onion exhibited an increase in deformation, charring, and ashy/sooty appearance compared to the IQF onion. The dehydro-roasted onion exhibited an increase in chalky texture, which is defined as an increased crispness, with minimal watery or mushy mouth feel. An increase in chalky texture translates into a food product with superior customer appeal because of solid mouth feel. The dehydro-roasted onion had a more browned aroma compared to the IQF onion that retained its typical pungent onion aroma. Also, the dehydro-roasted onion exhibited more cooked, sweet aromatics, browned, smoke, and sweet flavor, which is typically found in roasted onions when compared to the IQF onion. The dehydro-roasted onions exhibit characteristics typically found in a superior roasted food product.

Example 9

A side-by-side descriptive sensory analysis was performed by a panel consisting of six highly trained descriptive panelists testing for texture, flavor, appearance, and aroma. The panelists had more than 120 hours of descriptive training and average more than 2000 hours of testing experience.

The red bell peppers from Example 5 were analyzed, except commercially available Jon-Lin roasted IQF products were substituted for the IQF roasted products produced above. The substitution allows a comparison between roasted products currently on the market and the new products produced by dehydro-roasting. The products were separated into samples that were coded with random 3-digit codes and served one at a time in 8 oz. foam bowls. The samples were allowed to come to room temperature before evaluation. The samples were scored and based on a 15-point scale with 0.5 point increments.

Data was analyzed using analysis of variance and t-test (LSD means comparison) at 95% confident level and at 90% confident level, to determine if significant differences ($p<0.05$ and $p<0.10$ respectively) was present for all pairs or products. The results are as follows:

|  | Backward DR vs. IQF Red Pepper | | | Backward DR vs. DR Red Pepper | | | DR vs. IQF Red Pepper | | |
|  | Backward | | | Backward | | | | | |
|  | Dr | IQF | LSD | DR | DR | LSD | DR | IQF | LSD |
| --- | --- | --- | --- | --- | --- | --- | --- | --- | --- |
| Appearance | | | | | | | | | |
| Deformation | 9.04a | 4.50 | 0.53* | 9.04b | 9.42a | 0.26** | 9.42a | 4.50b | <0.01* |
| Color | 10.88 | 9.38 | Na | 10.88 | 12.08 | Na | 12.08 | 9.38 | Na |
| Charred | 5.88a | 2.46b | 2.10** | 5.88b | 9.46a | 2.12* | 9.46a | 2.46b | 6.35* |
| Texture | | | | | | | | | |
| Crispness | 3.17 | 3.75 | Na | 3.17 | 4.00 | Na | 4.00 | 3.75 | Na |
| Firmness | 5.38b | 5.75a | 0.26** | 5.38 | 5.67 | Na | 5.75 | 5.75 | Na |
| Skin Awareness | 7.71 | 7.79 | Na | 7.71 | 7.79 | Na | 7.79 | 7.79 | Na |
| Chalky | 1.29a | 0.29b | <0.01* | 1.29b | 2.42a | 0.53* | 2.42a | 0.29b | 0.53* |
| Aroma | | | | | | | | | |
| Red Pepper ID | 8.29b | 9.25a | 0.53* | 8.29 | 5.83 | Na | 5.83b | 9.28a | 2.63** |
| Smoke | 3.25 | 1.92 | Na | 3.25b | 5.79a | 1.32** | 5.79a | 1.92b | 2.89** |
| Browned | 9.29 | 8.50 | Na | 9.29 | 9.21 | Na | 9.21 | 8.50 | Na |
| Flavor | | | | | | | | | |
| Red Pepper ID | 8.67 | 9.96 | Na | 8.67 | 6.63 | Na | 6.63b | 0.96a | 1.06* |
| Cooked | 7.58 | 6.71 | Na | 7.58b | 8.17a | 0.53** | 8.17 | 6.71 | Na |
| Sweet Aromatics | 4.67 | 4.42 | Na | 4.67a | 4.21b | 0.26** | 4.21 | 4.42 | Na |
| Browned | 4.75a | 2.75b | 1.06* | 4.75 | 5.04 | Na | 5.04a | 2.75b | 1.32** |
| Smoke | 3.43 | 2.17 | Na | 3.42b | 6.00a | 2.12* | 6.00a | 2.17b | 3.16** |
| Burnt | 4.29a | 2.13b | 1.58** | 4.29b | 6.54a | <0.01* | 6.54a | 2.13b | 3.18* |
| Sweet | 2.29a | 1.92b | 0.26** | 2.29 | 2.08 | Na | 2.08 | 1.92 | Na |
| Sour | 1.38 | 1.54 | Na | 1.38 | 1.63 | Na | 1.63 | 1.54 | Na |
| Bitter | 3.17 | 2.88 | Na | 3.17 | 3.42 | Na | 3.42a | 2.88b | 0.53* | abc: Numbers with different letters within an attribute of each sample set are significantly different.
*LSD, the smallest difference between two means that would result in a significant difference at the 95% confidence level.
**LSD, the smallest difference between two means that would result in a significant difference at the 90% confidence level.

The following observations regarding the sensory analysis are displayed in the table above. The data illustrates that a superior flavor is produced with the dehydro-roasted method. The dehydro-roasted red bell peppers (RBP) compared to the IQF RBP had more deformation and charring appearance that is typically associated with roasted vegetables. The dehydro-roasted RBP exhibited an increase in chalky texture, and therefore, a better mouth feel. The dehydro-roasted RBP exhibited more smoke aroma and flavor, with more burnt and brown flavor that this typically exhibited in roasted food products when compared to the IQF RBP. The dehydro-roasted red peppers exhibit characteristics typically found in a superior roasted food product.

Example 10

A side-by-side descriptive sensory analysis was performed by a panel consisting of six highly trained descriptive panelists testing for flavor, texture, appearance, and aroma. The panelists had more than 120 hours of descriptive training and average more than 2000 hours of testing experience.

The zucchini from Example 7 were analyzed, except commercially available Jon-Lin roasted IQF products were substituted for the IQF roasted products produced above. The substitution allows a comparison between roasted products currently on the market and the new products produced by dehydro-roasting. The products were separated into samples that were coded with random 3-digit codes and served one at a time in 8 oz. foam bowls. The samples were allowed to come to room temperature before evaluation. The samples were scored and based on a 15-point scale with 0.5 point increments.

Data was analyzed using analysis of variance and t-test (LSD means comparison) at 95% confident level and at 90% confident level, to determine if significant differences (p<0.05 and p<0.10 respectively) was present for all pairs or products. The results are as follows:

|  | Backward DR vs. IQF Zucchini | | | Backward DR vs. DR Zucchini | | | DR vs. IQF Zucchini | | |
|  | Backward | | | Backward | | | | | |
|  | Dr | IQF | LSD | DR | DR | LSD | DR | IQF | LSD |
| --- | --- | --- | --- | --- | --- | --- | --- | --- | --- |
| Appearance | | | | | | | | | |
| Deformation | 7.08 | 6.00 | Na | 7.08 | 7.21 | Na | 7.21 | 6.00 | Na |
| Charred | 1.83b | 4.21a | 1.84** | 1.83b | 2.67a | 0.53** | 2.67b | 4.21a | 1.32** |
| Ashy/Sooty | 1.92b | 4.29a | 1.32** | 1.92b | 6.33a | <0.01* | 6.33a | 4.29b | 1.32** |

-continued

| | Backward DR vs. IQF Zucchini | | | Backward DR vs. DR Zucchini | | | DR vs. IQF Zucchini | | |
|---|---|---|---|---|---|---|---|---|---|
| | Backward | | | Backward | | | | | |
| | Dr | IQF | LSD | DR | DR | LSD | DR | IQF | LSD |
| Texture | | | | | | | | | |
| Crispness | 4.00 | 4.08 | Na | 4.00 | 3.71 | Na | 3.71b | 4.08a | 0.26** |
| Firmness | 4.54 | 4.79 | Na | 4.54 | 4.58 | Na | 4.58 | 4.79 | Na |
| Chalky | 0.63 | 1.00 | Na | 0.63 | 1.50 | Na | 1.50 | 1.00 | Na |
| Aroma | | | | | | | | | |
| Zucchini ID | 8.17a | 4.08b | <0.01* | 8.17a | 4.38b | 0.53* | 4.38a | 4.08b | 0.26** |
| Grassy | 6.75a | 2.88b | 2.65** | 6.75a | 3.75b | 2.12* | 3.75 | 2.88 | Na |
| Smoke | 0.83b | 4.13a | 2.37** | 0.83b | 4.38a | 1.89** | 4.38 | 4.13 | Na |
| Browned | 1.38b | 3.58a | 1.59* | 1.38b | 3.25a | 1.32** | 3.25 | 3.58 | Na |
| Flavor | | | | | | | | | |
| Zucchini ID | 7.29 | 6.54 | Na | 7.29a | 6.17b | 0.79** | 6.17 | 6.54 | Na |
| Grassy | 4.08a | 2.96b | 0.53* | 4.08 | 2.88 | Na | 2.88 | 2.96 | Na |
| Cooked | 5.04 | 5.13 | Na | 5.04 | 5.21 | Na | 5.21a | 5.13b | <0.01* |
| Sweet Aromatics | 1.33 | 1.25 | Na | 1.33 | 1.29 | Na | 1.29 | 1.25 | Na |
| Browned | 2.00 | 2.58 | Na | 2.00 | 2.13 | Na | s.13 | 2.58 | Na |
| Smoke | 0.88b | 2.46a | 1.58** | 0.88b | 3.25a | 1.32** | 3.25a | 2.46b | 0.53* |
| Burnt | 0.67 | 1.92 | Na | 0.67 | 1.54 | Na | 1.54 | 1.92 | Na |
| Sweet | 1.21 | 1.21 | Na | 1.21 | 1.21 | Na | 1.21 | 1.21 | Na |
| Sour | 1.67 | 2.00 | Na | 1.67 | 1.79 | Na | 2.00 | 2.00 | Na |
| Bitter | 2.88 | 3.13 | Na | 2.88 | 3.46 | Na | 3.13 | 3.13 | Na | abc: Numbers with different letters within an attribute of each sample set are significantly different.
*LSD, the smallest difference between two means that would result in a significant difference at the 95% confidence level.
**LSD, the smallest difference between two means that would result in a significant difference at the 90% confidence level.

The following observations regarding the sensory analysis are displayed in the table above. The data illustrates that a superior flavor is produced with the dehydro-roasted method. The dehydro-roasted zucchini exhibited more charring and ashy/sooty appearance than the IQF zucchini. Also, the dehydro-roasted zucchini flavor shows an increase development in browned and cooked flavor when compared to the IQF zucchini. The dehydro-roasted zucchini exhibit characteristics typically found in a superior roasted food product.

As illustrated in the data collected the dehydro-roasted products produce a superior roasted food product. In particular, the dehydro-roasted samples exhibit the characteristics sought after by consumers when a roasted food product is desired. The roasting characteristics typically associated with the dehydro-roasted products will therefore be more appealing to consumers.

Thus, there has been shown and described a technique combining partial dehydration and roasting to produce a superior roasted food product, which fulfills all objects and advantages sought therefore. The invention illustratively disclosed herein suitably may be practiced in the absence of any element which is not specifically disclosed herein. It is apparent to those skilled in the art, however, that many changes, variations, modifications, and other uses and application to the technique combining partial dehydration and roasting to produce superior roasted food products and specifically roasted vegetables and fruits are possible, and also such changes, variations, modifications, and other uses and application which do not depart from the spirit and scope of the invention are deemed to be covered by the invention, which is limited only by the claims which follow.

What is claimed is:

1. A method for preparing roasted vegetables, wherein the method comprises: drying a vegetable to reduce the moisture level from 10% to 65% from the starting moisture level he vegetable; and roasting the vegetable for between about 0.25 seconds to about 15 seconds.

2. A method for preparing roasted vegetables as claimed in claim 1, wherein the vegetable is roasted before the step of being dried.

3. A method for preparing roasted vegetables as claimed in claim 1, further comprising reducing the size of the vegetable.

4. A method for preparing roasted vegetables as claimed in claim 3, wherein the size of the vegetable is reduced using a process selected from the group consisting of cutting, dicing, chopping, slicing, and combinations thereof.

5. A method for preparing roasted vegetables as claimed in claim 1, wherein the vegetable is roasted by a heating element.

6. A method for preparing roasted vegetables as claimed in claim 5, wherein the vegetable is roasted by a flame.

7. A method for preparing roasted vegetables as claimed in claim 1, further comprising treating the vegetable for long term storage.

8. A method for preparing roasted vegetables as claimed in claim 7, wherein the vegetable is treated for long term storage using a process selected from the group consisting of freezing, drying, freeze-drying, treating with preservatives, placing in an acidified solution and canned, placed in an acidified solution and refrigeration packaged, and combinations thereof.

9. A method for preparing roasted vegetables as claimed in claim 1, wherein the vegetable is dried using a process selected from the group consisting of centrifugation, air drying, and vacuum drying.

10. A method for preparing roasted vegetables as claimed in claim 9, wherein the vegetable is dried in a fixed bed convection dryer.

11. A method for preparing roasted vegetables, wherein the method comprises: reducing the size of a vegetable; drying the vegetable to reduce the moisture level from 10% to 65% from the starting moisture level of the vegetable; roasting the vegetable for between about 0.25 seconds to about 15 seconds; and treating the vegetable for long term storage.

12. A method for preparing roasted vegetables as claimed in claim 11, wherein the vegetable is roasted before the step of being dried.

13. A method for preparing roasted vegetables as claimed in claim 11, wherein the size of the vegetable is reduced using a process selected from the group consisting of cutting, dicing, chopping, slicing, and combinations thereof.

14. A method for preparing roasted vegetables as claimed in claim 11, wherein the vegetable parts are dried using a process selected from the group consisting of centrifugation, air drying, and vacuum drying.

15. A method for preparing roasted vegetables as claimed in claim 14, wherein the vegetable is dried in a fixed bed convection dryer.

16. A method for preparing roasted vegetables as claimed in claim 11, wherein the vegetable is treated for long term storage using a process selected from the group consisting of freezing, drying, freeze-drying, treating with preservatives, placing in an acidified solution and canned, placed in an acidified solution and refrigeration packaged, and combinations thereof.

17. A method for preparing roasted vegetables, wherein the method comprises:

reducing the size of a vegetable to produce vegetable parts;

drying the vegetable parts to reduce the moisture level from 10% to 65% from the starting moisture level of the vegetable;

roasting the vegetable parts with a flame for between about 0.25 seconds to about 15 seconds; and treating the vegetable parts using a process selected from the group consisting of freezing, drying, freeze-drying, treating with preservatives, placing in an acidified solution and canned, placed in an acidified solution and refrigeration packaged, and combinations thereof.

18. A method for preparing roasted vegetables as claimed in claim 17, wherein the vegetable parts are roasted before the step of drying the vegetable parts.

19. A method for preparing roasted vegetables as claimed in claim 17, wherein the vegetable parts are dried using a process selected from the group consisting of centrifugation, air drying, and vacuum drying.

20. A method for preparing roasted vegetables as claimed in claim 19, wherein the vegetable parts are dried in a fixed bed convection dryer.

21. A roasted vegetable produced according to the process of claim 1.

22. A roasted vegetable produced according to the process of claim 11.

23. A roasted vegetable produced according to the process of claim 17.

24. The method of claim 1 further comprising branding the vegetable after drying.

\* \* \* \* \*